United States Patent
Hamm et al.

(10) Patent No.: US 7,868,271 B2
(45) Date of Patent: Jan. 11, 2011

(54) CONTROL DEVICE AND METHOD FOR EVALUATING A CONTROL DEVICE

(75) Inventors: Wolfgang Alfred Hamm, Bretten (DE); Martin Baier, Ettlingen (DE); Ralf Dorwarth, Oberderdingen (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 454 days.

(21) Appl. No.: 11/934,358

(22) Filed: Nov. 2, 2007

(65) Prior Publication Data

US 2008/0088407 A1 Apr. 17, 2008

Related U.S. Application Data

(63) Continuation of application No. PCT/EP2006/004176, filed on May 4, 2006.

(30) Foreign Application Priority Data

May 4, 2005 (DE) .................... 10 2005 021 890

(51) Int. Cl.
*H05B 1/02* (2006.01)

(52) U.S. Cl. .................. 219/482; 219/494; 219/504; 219/491; 219/446.1; 219/443.1

(58) Field of Classification Search ................ 219/482, 219/491, 493, 497, 504, 505, 446.1, 448.11, 219/443.1
See application file for complete search history.

(56) References Cited

U.S. PATENT DOCUMENTS

| | | | |
|---|---|---|---|
| 3,819,960 A * | 6/1974 | Kohn et al. .................. 327/518 |
| 4,092,520 A * | 5/1978 | Holmes et al. .............. 219/504 |
| 4,849,595 A * | 7/1989 | Fowler ........................ 219/719 |
| 5,113,172 A | 5/1992 | Lang | |
| 5,224,453 A | 7/1993 | Bederna et al. | |
| 6,246,232 B1 | 6/2001 | Okumura | |
| 2003/0159500 A1 | 8/2003 | Samoto et al. | |

FOREIGN PATENT DOCUMENTS

| | | |
|---|---|---|
| DE | 34 15 495 A1 | 10/1985 |
| DE | 196 49 906 | 6/1998 |
| DE | 197 12 294 | 10/1998 |
| DE | 298 12 976 | 11/1998 |
| DE | 198 10 844 A1 | 9/1999 |
| GB | 2 243 689 | 11/1991 |

OTHER PUBLICATIONS

International Search Report for PCT/EP2006/004176, dated Jul. 14, 2006.
German Search Report for German Application No. 102005021890.3.

* cited by examiner

*Primary Examiner*—Mark H Paschall
(74) *Attorney, Agent, or Firm*—Alston & Bird LLP

(57) ABSTRACT

A control device for converting a control movement along a control path into a control signal has the control path corresponding to different control stages or control types. The control device has two measuring tracks with a linearly changing resistance associated with each track. In one embodiment, these measuring tracks are positioned concentric to each other in a semicircle. A voltage U, which is tapped via two opposite interconnected sliders, is applied to both measuring tracks at a junction point while the other junction point is connected to ground. If the detected values of the tapped voltages deviate from a corresponding stored value or pairs of values, there must be a fault, due to, for example a broken slider. This makes it possible to perform a test for determining the fault or a malfunctioning control device.

17 Claims, 2 Drawing Sheets

CONTROL DEVICE AND METHOD FOR EVALUATING A CONTROL DEVICE

CROSS REFERENCE TO RELATED APPLICATIONS

This application is a continuation of PCT/EP2006/004176, filed May 4, 2006, which in turn claims priority to DE 10 2005 021 890.3, filed on May 4, 2005, the contents of both of which are incorporated by reference.

FIELD OF INVENTION

The invention relates to a control device and to a method for evaluating such a control device, such as is for example used for an electrical appliance in the form of a hob or the like, in which a control movement along a control path is converted into a control signal. The control path corresponds to different control stages or control types and the control signal is dependent on the control path covered.

BACKGROUND FOR THE INVENTION

It is possible to construct a control device to provide resistance tracks on a rotary toggle switch along which a slider can be rotated for tapping purposes. Another end of said slider runs on a parallel conducting track for the tapping of the signal. As a function of the control path or control position at said point, there is a specific electrical resistance or a specific voltage value, which can be evaluated and associated with a specific control stage or control type.

It is possible that due to a bent or even broken slider, or damaged resistance or conducting tracks, the measurement cannot be reliably recognized or this only takes place with significant effort, thereby causing possible errors. This can bring about a deterioration to the control and operating reliability.

BRIEF DESCRIPTION OF THE DRAWINGS

Embodiments of the invention are described in greater detail hereinafter relative to the attached diagrammatic drawings, wherein.

DETAILED DESCRIPTION OF THE EMBODIMENTS

Figure 1:
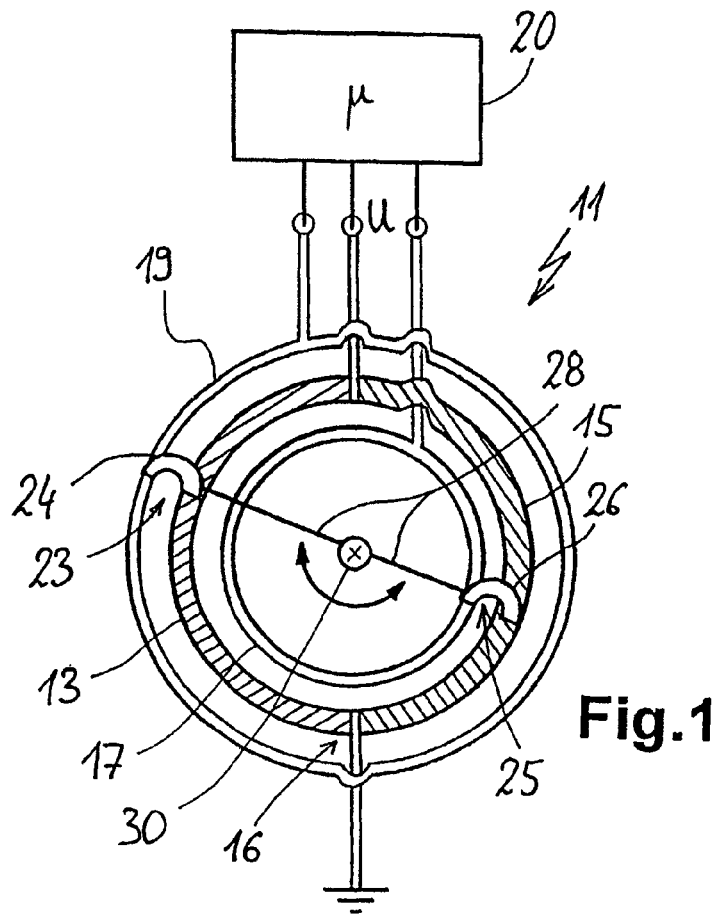
FIG. 1 illustrates an arrangement of two interconnected semicircular measuring tracks with varying electrical resistance and two straight line positioned sliders for signal tapping.

A problem addressed by the invention is to provide an aforementioned control device and an evaluating method making it possible to overcome the disadvantages of the prior art and permit reliable operation together with the monitoring of the control device for fault-free state or operation.

This problem is solved in one embodiment by a control device having the features of claim 1. Advantageous and preferred embodiments of the invention form the subject matter of the further claims and are explained in greater detail hereinafter. By express reference the wording of the claims is made into part of the content of the description. Features describing both the control device and the evaluating method are in part only explained once hereinafter. However, independently of this they apply for all aspects essential to the invention.

There are provided at least two measuring tracks, which in each case have identical physical characteristics and which are in particular constructed in a similar or identical manner. In each case, said physical characteristics are used for tapping a measured value. However, the physical characteristic in connection with the measuring tracks can change from the given start to the given end in a monotonically increasing or decreasing manner, or some embodiments, in a strictly monotonic manner. Within the scope of the present invention, this also means that the change can take place in stages and the stepping is relatively fine. Along each measuring track or relative thereto it is possible for a detection device to move and which detects the measured value of the physical characteristic present at each point where it happens to be located. Moreover, in each case, the measuring tracks are mechanically connected to one another, and during the control movement detection devices move relative to the measuring tracks and in each case cover the same length path. According to one embodiment of the invention, the physical characteristics of the measuring tracks are such that an addition of the detected measured values of the detection devices in the trouble-free control state always gives a preset or known value. In particular, said value corresponds to a stored value or is a constant.

Thus, it is possible during the control movement and corresponding to a conventional procedure, to detect a measured value as a control signal corresponding to a covered control path and which consequently changes in accordance with the control movement. It is simultaneously possible for function monitoring to determine in an easy, interference-proof manner whether independently of the changing measured values their sum remains constant, which indicates that on the measuring tracks there is a prescribed, correct measured value detection. If, for example, a detection device fails or in faulty manner determines a measured value does not corresponding to the control path covered, then the sum of the measured values differs from the preset value. This can easily be recognized and indicates an interference state or error. Recognition can also take place here in that the two detected values are compared for coincidence purposes with stored values. Then in the case of an error or fault, the control device can be switched off or an alarm can be triggered for an operator. It is also possible here, as a function of the magnitude of the divergence, to provide dependent, differing reactions. If the divergence is in a very small or gradual range, but which can be simultaneously expected, this can be recognized as a degradation of the control device for the measuring tracks or the detection devices and there can be a correction of the preset value. However, if the divergence is so great that it can only be caused by a fault or error, this is recognized and there is a signal output, an alarm or a switching off of the electrical appliance.

In another embodiment of the invention, the measuring tracks are parallel to one another. This is particularly appropriate if the control device is constructed as a sliding switch. Here, a control movement can be a sliding action, particularly along a straight line. This sliding movement follows the course of the measuring tracks.

In an alternative embodiment, the measuring tracks can be pitch circular and in particular semicircular in each case. The measuring tracks advantageously connect to one another. When using two measuring tracks in semicircular form, they can connect to one another in such a way that in certain circumstances they give a complete circle, apart from a short, intermediate separation zone. In this case, the control movement is a rotation and even with parallel measuring tracks a rotation can be implemented as a control movement. The control path is almost 360°.

Thus, whereas in the case of a sliding movement the control path is more particularly subdivided into different length stages, with a rotary movement as the control movement there is a subdivision into different rotation angles or positions. As a function of the radius of the measuring tracks this can naturally be converted into a covered control path, which is in the physical sense of detecting the measured value as a function of the length of the control path covered on the measuring track.

In another embodiment of the invention, alongside each measuring track, there is a detection track, which cooperates with the detection device. The detection track is used for tapping the measured value detected by the detection device and supplying same to an evaluation or control mechanism, etc. Measuring tracks and detection tracks associated with one another are advantageously parallel to one another. It is particularly advantageous for the measuring tracks and detection tracks to be curved and in particular at least partly pitch circular. Advantageously, they correspond to the aforementioned construction with measuring tracks giving a complete circle when interconnected, as well as with corresponding detection tracks.

In another embodiment of the invention with circular measuring tracks, it is possible for the division of said tracks to take place symmetrically, i.e., preferably in the case of measuring tracks as a complete circle each individual measuring track precisely forms a semicircle. The detection devices can so-to-speak also be symmetrically constructed, i.e., precisely facing one another or being mutually offset by an angle of 180°. This makes it possible in a particularly simple manner the aforementioned addition of the measured values at the detection devices gives as a control the complete signal level applied. However, it is problematical here that because of the symmetrical arrangement there can be an error during detection by 180° of the rotation angle over the measured values. Moreover, starting from a normal position, where in each case a detection device is located at the start of finish of a measuring track, the start of the rotation direction cannot be precisely differentiated, because simultaneously the physical characteristic increases or decreases independently of the rotation direction.

To avoid this, or to be able to detect an always given lack of ambiguity between the measured value detectable at each detection device and the position or angular position, advantageously the measuring track is divided into two different pitch circles, whereof one has more than 180° and the other less than 180°. The difference with the arc angle can for example be 20° to 30°, but higher or lower values are also possible. In this case the detection devices can precisely face one another or can be turned by an angle of 180°. Alternatively, the measuring track in the case of a circular shape can be subdivided into two equally large pitch circles. However, then the detection devices are to be mutually offset or have an arc angle of more or less than 180° to one another. The angle difference can here be similar to the previous situation for the different subdivision of a complete circle into two pitch circles of different sizes, for example 20° to 30°.

In these two asymmetrical design possibilities, there is always a clear association between the two measured values detectable at the detection devices and the angular or rotary position. On storing in the memory of the detection device or an associated control mechanism the associations between said measured quantities and a rotary position, conclusions can be drawn from the measured quantities regarding a correct operation of the control device and the set rotation angle.

In another embodiment of the invention, it is possible for the measuring tracks to have a correspondingly varying electrical resistance. This corresponds to the physical characteristic or along the measuring tracks via the detection devices the electrical resistance is detected as a measured value via the intermediate stage of a voltage measurement, and this in each case forms the measured value. It is possible for the control device to have contact sliders or pickups. A measured value can be tapped and the electrical resistance or a voltage can be detected at a specific point of a measuring track using the detection device. When using contact sliders or the like for detection, one end thereof should run along the measuring track and the other end or an electrical terminal, such as a cable or the like, should be guided on a signal pickup, particularly a detection track.

A particularly simple construction is obtained if the measuring tracks are in each case formed from identical resistance material with a constant resistance per length unit and to which a voltage can be applied, which uniformly changes corresponding to the distance from the supply location, namely decreasing with a greater distance. Different resistance paths can be easily produced by different widths of the resistance tracks.

Advantageously, such a detection track runs parallel or alongside an associated measuring track. In the case of a previously mentioned construction with two semicircular measuring tracks connected to one another in circular manner, it is possible for there to be a detection track within the circle, with a further detection track radially outside the measuring track circle. Thus, over a full rotation it is possible to, in each case, produce different measured values and therefore with a correspondingly possible fine subdivision produce a plurality of different control signals. It is particularly simple to bring about a construction of the measuring tracks as changing electrical resistance tracks together with the measured value, tapping via sliders or contact pickups or the like. It is possible to make use of known knowledge concerning rotary potentiometers, etc., particularly with respect to the construction of the sliders and resistance tracks.

In an alternative embodiment of the invention, the measuring tracks can have changing optical characteristics as measured quantities. It is particularly appropriate to have an increasing or decreasing light permeability. It is also possible to have changing reflection or diffusion characteristics, particularly in the case of optical surfaces. Such a construction can follow similar basic principles to those described hereinbefore. The measuring tracks can in particular be straight for a sliding control movement or curved or connecting in circular manner for a rotary control movement.

For detecting the changing optical characteristics with decreasing or increasing light permeability, the detection devices can have light barriers between which there is a measuring track. For a measured value detection or electrical signal transmission, it is advantageous for the detection device light barriers to be fixed. The measuring tracks can move relative thereto, for example in the form of strips or disks with the above-described, optical characteristics.

In another alternative embodiment of the invention, the measuring tracks can have as the measured value varying magnetic characteristics, similar to the above-described electrical resistance or optical characteristics. The measured value can be a varying magnetic field strength or permeability of the measuring tracks.

For the evaluation of the magnetic characteristics as the measured value the detection devices can have magnetic field sensors, for example Hall sensors. As described hereinbefore, it can also be advantageous here for the detection devices to be stationary and the measuring tracks movable. This has the important advantage that the signal transmission in the case of light barriers or magnetic field sensors is more difficult using sliders or the like than merely a resistance measurement.

In further embodiments, the measured value capacitive characteristics can change and can be evaluated using capacitive sensors or capacitor arrangements.

To the detection devices is connected a signal processor or evaluation means in which, by means of the detected measured values, control signals are generated and can be associated with corresponding control functions. Moreover, addition of the measured values can take place with monitoring as to whether they correspond to the preset value. This can change in the case of the detected measured values, especially over and beyond the control path. Alternatively, and in a particularly simple development, the addition of the measured values in the trouble-free operating state in each case gives a constant.

These and further features can be gathered from the claims, description and drawings and the individual features, both singly and in the form of subcombinations, can be implemented in an embodiment of the invention and in other fields and can represent advantageous, independently protectable constructions for which protection is claimed here. The subdivision of the application into individual sections and the subheadings in no way restrict the general validity of the statements made thereunder.

FIG. 1 shows a control device 11, such as can in particular be used for an electrical appliance as a control device with control toggle, for example for setting a hotplate power. Two different measuring tracks 13 and 15 (shown with hatched lines) are applied to a support such as a printed circuit board. They have a semicircular construction and are interconnected at the bottom at lower connection point 16. They are designed as a resistance track in such a way that they have a similar construction and with increasing length have a uniformly rising or falling electrical resistance.

This means with a voltage U applied to the upper connection point and a lower connection point connected to earth or ground, the voltage along measuring track 13 decreases counter-clockwise from top to bottom. Due to the similar construction of the measuring tracks, the electrical resistance of the measuring track changes directly with its length. The same applies in the right-hand measuring track 15, except that it increases with the same movement. Here again, close to the upper connection point, the voltage applied is equal to U. At the lower connection point 16 it is zero, because this is grounded.

An inner detection track 17 made from low resistance material runs within the measuring tracks 13 and 15. Outside the measuring tracks there is an outer detection track 19 made from the same material as the inner detection track 17. As is apparent, the circles formed by the different tracks are concentric.

The detection tracks 17 and 19 have electrical terminals, as do the measuring tracks 13 and 15, which are led to a control mechanism 20, which applies voltage U to measuring tracks 13 and 15 and evaluates detection tracks 17 and 19.

To the left in FIG. 1 a detection device 23 is shown with a slider 24, which engages both on the left-hand measuring track 13 and on the outer detection track 19 corresponding to a normal tapping slider. To the right in FIG. 1 there is another detection device 25 with a slider 26 engaging on the right-hand measuring track 15 and inner detection track 17. The detection devices 23 and 25 or their sliders 24 and 26 are positioned precisely facing one another. They are interconnected by a mechanical connection 28, for example a connection bridge. They are also connected to a shaft 30 of a control toggle running through the centre of the circular paths using said mechanical connection 28. This means that a control movement in accordance with the arrow on rotating shaft 30, the sliders 24 and 26 run along different paths. In each location the sliders 24 and 26 precisely face one another.

For evaluating a covered control path or a specific angular position as the control position, for each of the two sliders 24 or 26 a voltage value is detected by control mechanism 20 incorporating a processor. By means of the known link between the angular position and the voltage, particularly due to the path length covered along one of the measuring tracks 13 and 15, a voltage can be detected that precisely represents said angle and is converted into corresponding control signals. The link between the angular position and voltage as the measured value is stored in a memory, particularly in control mechanism 20. The corresponding angular position can be stored for each voltage value detected at a slider.

An advantage of the invention according to this embodiment is that in the control mechanism 20, it is possible to sum the voltage values tapped at sliders 24 and 26. As a result of the voltage changing linearly with the covered length of the measuring tracks 13 or 15 or decreasing from top to bottom as a fraction of the voltage U applied, the addition of the tapped values precisely or almost precisely gives said voltage U. Thus, in addition to the determination of the angular position of sliders 24, 26 or the control toggle shaft 30, it is possible to monitor for the correct operation of control device 11. If the sum of the voltage values tapped at sliders 24, 26 differs recognizably or significantly from the expected applied voltage value U, then a fault situation must exist. This can be used for outputting a corresponding signal to an operator. In addition, the control mechanism 20 can partly or completely switch off the associated electrical appliance. The control mechanism 20 can in particular recognize that the control signal obtained corresponding to the position of shaft 30 and sliders 24, 26 is unusable, because an error or fault must exist.

As a variant to the measuring tracks 13 and 15 with a linear change to the electrical resistance over the length thereof, it is possible to make this change non-linear or progressively increasing or decreasing. With respect to the course of the resistance, it must however be borne in mind that the voltage addition at opposite points always gives a constant value. It is alternatively possible to store values in control mechanism 20 which make possible an association between the corresponding addition of the tapped voltages of opposite points with individual resistances corresponding to this position at each of the measuring tracks or sliders 24, 26. Thus, control mechanism 20 can also establish whether at specific known measured values the control sum corresponds to what is expected or to correct operation. It must be borne in mind that in each case a constant sum of the electrical resistance at opposite points of the measuring tracks can be evaluated more easily and ensures greater operational reliability.

If slider 24 starts at the top position, i.e., at the upper connection point between measuring tracks 13 and 14 and is rotated clockwise, firstly the full voltage U is applied and this can then be tapped by means of the corresponding, outer detection track 19. The voltage at slider 24 decreases along the control path or movement until it reaches zero at the lower point at the lower connection point between the measuring tracks 13 and 15. On further rotation beyond said point, the voltage again starts to increase from zero and rises in a mirror-inverted manner relative to the preceding decrease.

Figure 2:
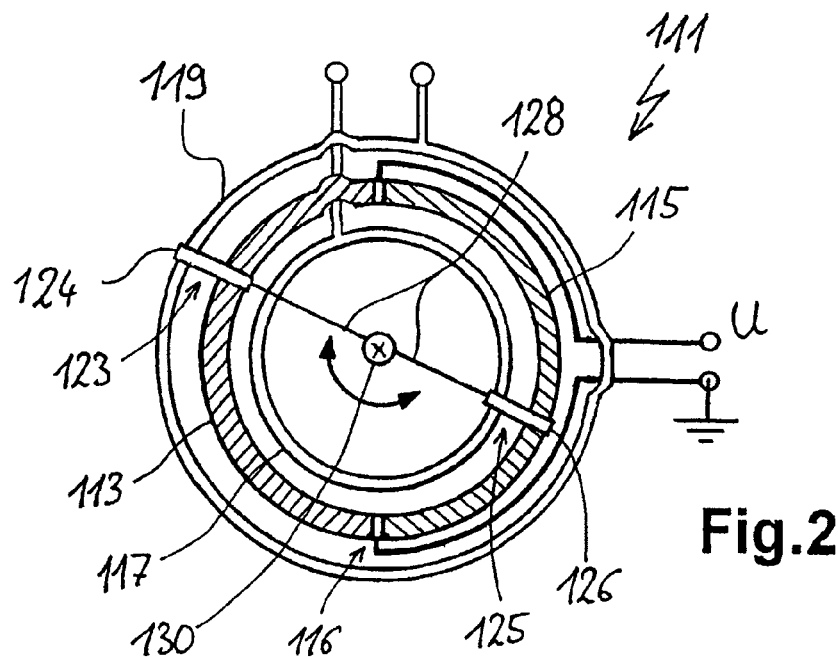
FIG. 2 illustrates a variation of the arrangement according to FIG. 1 with modified contacting.

FIG. 2 shows a modified control device 111 with terminals at detection tracks 117, 119 differing from FIG. 1, but this does not alter the basic function.

Figure 3:
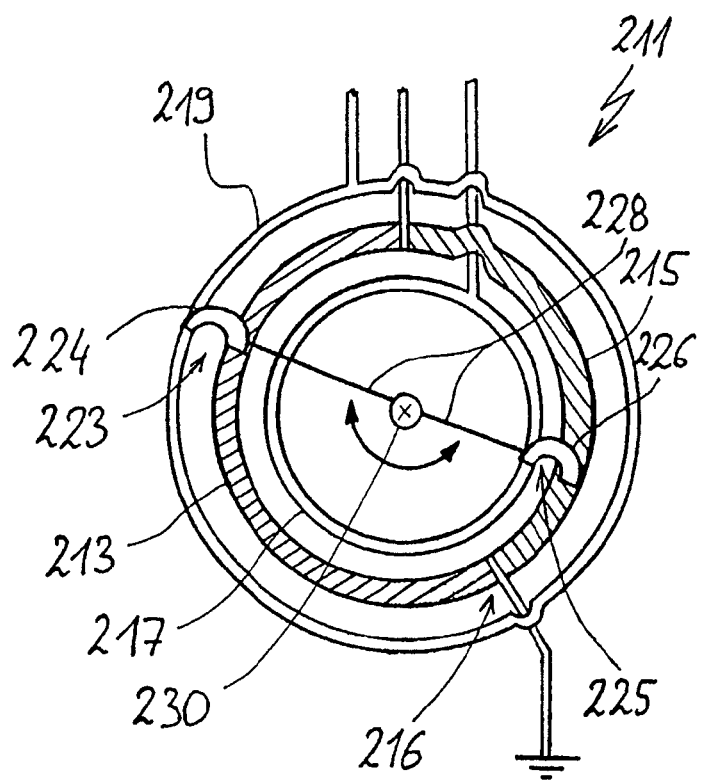
FIG. 3 illustrates a further variation of the control device of FIG. 1 with sliders at an angle to one another.

FIG. 3 shows another variant of control device 211 similar to FIG. 1. The essential difference compared with control device 11 in FIG. 1 is that here the division of the two measuring tracks 213, 215, which together give a complete circle, is not symmetrical. This is made clear by the fact that the lower connection point 216, which is connected to ground, is rotated counter-clockwise. As a result, the measuring track 213 covers an angle of approximately 210° and the measuring track 215 covers an angle of only 150°, and to this extent, there is an asymmetrical subdivision of the measuring tracks.

The detection devices 223, 225 or their mechanical connection 228 in the form of two arms starting from shaft 230 is straight. Thus, there is always an angle of 180° between them.

With this control device 211 it is clear that for each position only a single pair of measured values of the measured quantities is possible at sliders 224 and 226. In particular, there is complete clarity regarding the rotation direction.

However, in this case, it is no longer possible to assume that an addition of the measured values at sliders 224, 226 gives the voltage U applied at the upper connection point, it is necessary to work here with the aforementioned storage of the mutual association of different pairs of measured values with linked rotation angle positions or rotary positions. For this purpose the values can be stored in a control mechanism similar to control mechanism 20 in FIG. 1.

Figure 4:
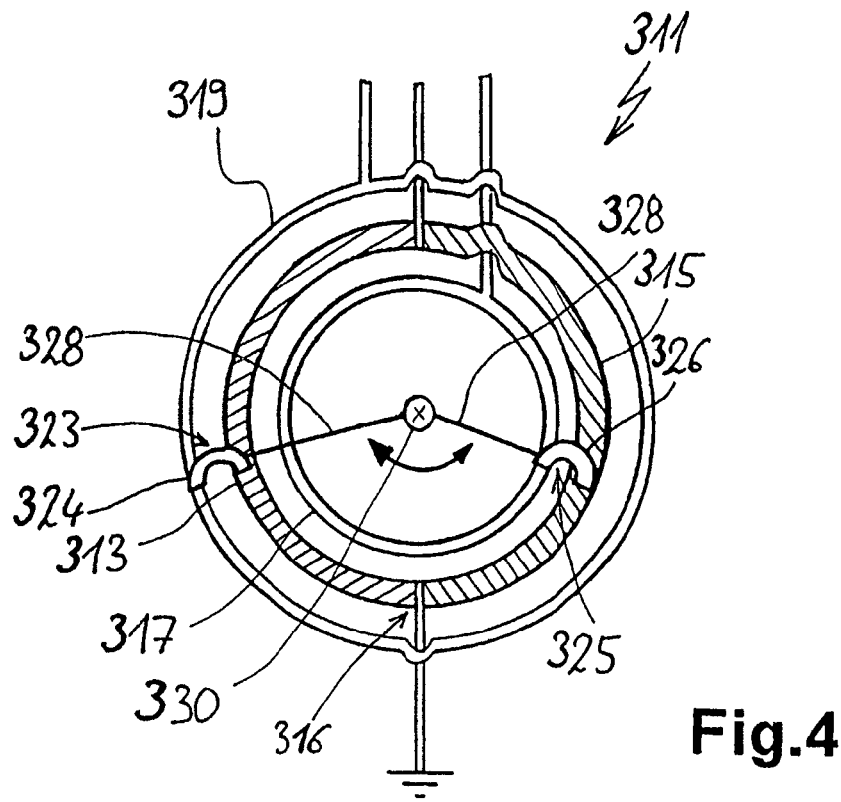
FIG. 4 illustrates a further variation of the control device of FIG. 1 with non-symmetrically divided measuring tracks.

In a further variant, as found in FIG. 4, it can be seen that the measuring tracks 313 and 315, corresponding to FIG. 1, are subdivided symmetrically and consequently the two connection points precisely face one another. However, the detection devices 323, 325 or the corresponding sliders 324, 326 and mechanical connections 328 are mutually offset. In particular, in a downwardly directed manner, they describe an angle of 150°.

Corresponding to the statements on FIG. 3, here again the control device 311 in each rotary position there is a clear association between the measured values at sliders 324, 326 and the corresponding rotation position. As stated regarding FIG. 3, these values are to be stored in a memory and correspondingly polled for determining the correct function of control device 311 and in particular for determining the rotation position.

Another major advantage of these designs is that the tracks can be easily produced. In particular, only a single measuring track has to be applied by carbon print or the like to a support. The tracks through the inner detection track can be relatively close and therefore the construction is small. With equal spacing from the two detection tracks, the sliders can be identical.

In another embodiment of the control device according to the invention for converting a control movement along a control path into a control signal, in which the control path corresponds to different control stages or types, there are two measuring tracks with a changing resistance and are connected in semicircular manner. To both is applied at a connection point a voltage U, which can be tapped by means of two facing, interconnected sliders. The other connection point is connected to ground. If the detected values of the tapped voltages differ from corresponding, stored values or value pairs, which can be recognized by means of a control mechanism, there must be an error or fault at the control device, for example a broken slider and then monitoring or testing can take place.

The invention claimed is:

1. A control device for an electrical appliance such as a hob, for converting a control movement along a control path into a control signal,
   wherein said control signal is dependent on said control path covered during said control movement,
   wherein at least two measuring tracks each having identical physical characteristics are provided with a measured value of said physical characteristic of said measuring tracks, which in case of both said measuring tracks said measured value increases or decreases monotonically along said measuring tracks,
   wherein along each said measuring track a respective detection device is provided for accomplishing the measured value of each measuring track's physical characteristic, said detection device capable of being moved relative to said measuring tracks,
   wherein said measuring tracks are interconnected and said detection devices are mechanically interconnected and move relative to one another along said measuring tracks so as cover a same distance during said control movement,
   said physical characteristics of said measuring tracks being such that a summation of said measured values in a normal operating state of said control device equals a preset value stored in said control device,
   wherein said measured value is used by said control device to generate said control signal.

2. The control device according to claim 1, wherein said preset value is a constant.

3. The control device according to claim 1, wherein said preset value and individual values for a plurality of positions of said measuring track are stored in a memory of a controller of said control device for determining position of said detection device.

4. The control device according to claim 3, wherein said preset value is stored in conjunction with said measured values in said controller.

5. The control device according to claim 1, configured to provide a fault output when there is a divergence of said summation of said measured values from said preset value in a control state, said control state being a faulty control state.

6. The control device according to claim 1, wherein said measuring tracks in each case have a partially circular construction and said control movement is a rotation.

7. The control device according to claim 6, comprising a plurality of said measuring tracks so constructed so that they connect to one another and form a complete circle.

8. The control device according to claim 7, wherein said measuring tracks each have a partially circular shape of different sizes and said detection devices form an angle of approximately 180° between them.

9. The control device according to claim 1, wherein said measuring tracks are subdivided into two identical partially circular shapes each of approximately 180°, and wherein said detection devices have a mutual angle of less than 180°.

10. The control device according to claim 1, wherein said control movement is a sliding movement.

11. The control device according to claim 10, wherein said control movement is along a straight path and said measuring tracks run parallel to said control movement.

12. The control device according to claim 1, wherein alongside each of said measuring tracks there is provided a detection track with a detection device for measuring a physical characteristic of said measuring track.

13. The control device according to claim 12, wherein said measuring track and said associated detection track run with a same mutual spacing.

14. The control device according to claim 1, wherein said measuring tracks have a varying electrical resistance as said physical characteristic and said electrical resistance forms said measured value.

15. The control device according to claim 12, wherein contact sliders are provided as said detection devices for detection of said measured value of said electrical resistance, said contact sliders simultaneously contacting an associated detection track.

16. The control device according to claim 6, wherein one of said detection tracks is positioned radially within said measuring tracks and another of said detection tracks is positioned radially outside said measuring tracks.

17. The control device according to claim 16, wherein said two detection tracks in each case are in the form complete concentric circles.

* * * * *